2,534,876

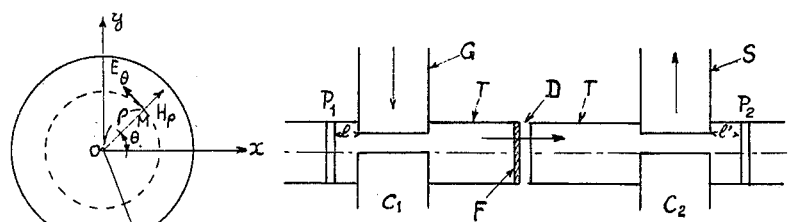
Fig. 1  Fig. 3
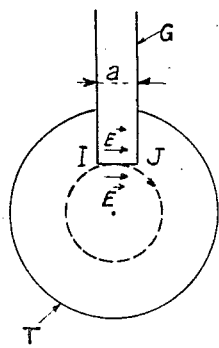 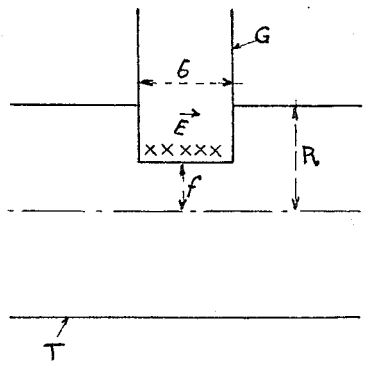
Fig. 2a  Fig. 2b
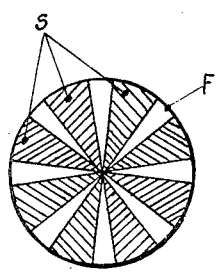
Fig. 4
INVENTORS
ANTOINE J. ORTUSI
RAYMOND PAUL
BY Haseltine Lake & Co.
AGENTS Patented Dec. 19, 1950

UNITED STATES PATENT OFFICE 2,534,876

WAVE GUIDE COUPLING ARRANGEMENT

Antoine Jean Ortusi and Raymond Paul, Paris, France, assignors to Compagnie Generale de Telegraphie Sans Fil, a corporation of France Application April 29, 1948, Serial No. 24,064
In France May 21, 1947

7 Claims. (Cl. 178—44)

The present invention relates to the transformation of waves of the $H_{01}$ type into waves of the $H_0$ type, the latter being more especially intended for passage through a rotary connecting member arranged between two circular guides, adapted to transmit the said wave.

According to certain known constructions the transmission of energy of high frequency between two elements connected by a rotary joint was achieved in two ways, either by means of a coaxial cable, or by means of circular guides in which a wave of the $E_0$ type is propagated.

In the case of a coaxial guide, at the junction between the two elements, the device radiates a considerable amount of energy, and in order to avoid glow-discharge losses between said two elements, a system of wave traps must be arranged, said traps consisting of a circular groove or throat arranged between the two cheeks of the joint and having a depth equal to a quarter the length of the operating wave. These traps are always of delicate construction and they reduce the yield of energy. Moreover, the power that can be transported without fear of glow-discharge losses is practically restricted to a very low value for numerous applications.

In the case of the circular guide, the use of a wave of the $E_0$ type permits the employment of greater powers without encountering the disadvantages of the coaxial cable, but in order to avoid radiation between the two elements, a "wave trap" must always be used.

These disadvantages are avoided by using a wave of the $H_0$ type for the passage through the connecting joint. This type of wave presents indeed the peculiarity of having a zero longitudinal current on the wall of the guide. The interruption of said wall for the purpose of introducing a joint produces no disturbance with this type of wave, and it is therefore not necessary to provide a system of wave traps since there is no radiation.

The use of this type of wave has been proposed in French Patent No. 893,606, filed by applicant on May 7, 1942, according to which a wave of the $H_{01}$ type is transmitted by a rectangular guide, the section of which is progressively narrowed until it forms a triangle, said triangle then opening progressively as the wave advances until a circular section is obtained, the starting wave thus being transformed into a wave of the $H_0$ type, which is thereafter propagated in a circular guide connected for this purpose to the circular section previously obtained.

The present invention makes use both of the $H_{01}$ wave propagated in a rectangular guide and of the $H_0$ wave propagated in a circular guide, said guides being joined to each other, and the principal object of the invention is to provide an improved form of embodiment of said device. More particularly it does not use a double progressive modification of the section of the rectangular guide with its delicate construction and it permits achievement of the same result while considerably simplifying the construction.

According to the present invention the rectangular guide penetrates into the interior of the circular guide radially, the axis of the rectangular guide coinciding with a projected radius of the circular guide, and the arrangement is such that the directions of the electric fields of the two waves practically coincide. The depth of this penetration is regulated preferably so that it corresponds to the maximum intensity of the field of the $H_0$ wave in the circular guide.

This device is completed by a corrector consisting of a rectangular guide element with a plane and conducting terminal wall placed opposite to the inlet guide, said wall being at the level of the axis of the circular guide, and by a piston insuring the proper phase relationship.

The figures attached hereto show a form of embodiment by way of non limiting example.

Fig. 1 shows the form of distribution of the lines of electric and magnetic forces of the $H_0$ wave in a cross-section of a circular guide;

Figs. 2a and 2b represent a device according to the present invention for transforming the $H_{01}$ wave into the $H_0$ wave;

Fig. 3 shows the application of this device to the realization of the rotary connecting joint; and Fig. 4 shows a filter of suitable form arranged in the circular guide containing the rotary joint.

In order to convey a better understanding of the present invention the general features of the waves utilized may first be recalled.

Fig. 1 shows, in the perpendicular cross-section of the circular guide through which the $H_0$ wave passes, the arrangement of the electric and magnetic fields. The axis of the guide is assumed to be the axis of the $z$'s and at a point M of the section, defined by its polar coordinates $\rho$ and $\theta$, the electric and magnetic fields are determined by their components $E_\theta$, $E_\rho$, $E_z$, on the one hand, $H_\theta$, $H_\rho$, $H_z$ on the other hand, which satisfies the relationship:

$$E\theta = E'_0 J'_0(\alpha\rho) e^{i(\omega t - K_z z)} \quad E\rho = E_z = 0$$
$$H\theta = 0$$
$$H\rho = -\frac{K_z}{K} E_0$$
$$H_z = \frac{i}{K} \alpha E_0 J_0(\alpha\rho) e^{i(\omega t - K_z z)}$$

wherein $J_0$ is a Bessel function of the order zero and $J'_0$ its derivative. It is known that $J'_0 = -J_1$, $J_1$ being the Bessel function of the order 1.

The electric lines of force are thus circles with the center O, and the magnetic lines of force in this plane are thus radii vectors proceeding from O.

The relation $H_o=0$ involves the previously mentioned condition that the longitudinal current $I_z=0$.

For a given radius R of the circular guide, $a$ is selected so that $J_1(aR)=0$, with $a2=k^2-k_z^2$.

If $\lambda G$ is the wave length in the guide and $\lambda a$ the wavelength in air, $k$ and $k_z$ satisfy the conditions:

$$k=\frac{2\pi}{\lambda a} \quad \text{and} \quad k_z=\frac{2\pi}{\lambda G}$$

The cutoff wavelength $\lambda c$, that is to say the greatest wavelength permitting the propagation without attenuation, is such that $J_1(aR)=0$.

This equation has a root $R=3.83$ so that $$\alpha=\frac{2\pi}{\lambda c}=\frac{3.83}{R}$$

Figures 2a and 2b illustrate the device according to the invention which permits the transformation of the $H_{01}$ wave into the $H_0$ wave. They offer two views thereof in section at right angles to each other. The energy is fed into the circular guide T, shown in end view (Fig. 2a) and in elevation (Fig. 2b) by means of the rectangular guide G penetrating radially into the circular guide: on the one hand guide G is so placed that the electric vector of the $H_{01}$ wave, which is perpendicular to the large dimension $b$ and parallel to the small dimension $a$, may be practically parallel to the electric vector of the $H_0$ wave along the terminal section IJ; on the other hand, its position, defined by the distance $f$ from its opening to the axis of the circular guide, is such that this distance will have a value bordering on the value $\rho_0$ rendering maximum function $J_1(a\rho_0)$, that is to say at the place where the field of the $H_0$ wave is maximum, $\rho_0$ being then defined by the relationship $a\rho_0=1.84$.

Fig. 3 shows the application of the preceding arrangement to an installation comprising a rotary joint D, disposed between the two circular guides T, said installation comprising on both sides of the joint, the following elements:

On the left-hand side of the figure is seen the assembly of the two guides T and G, with the use of a corrector $C_1$ consisting of a rectangular guide element terminated by a conducting plane surface the axis of which coincides with the axis of the inlet guide and of a conducting piston $P_1$ at the end of the guide T. The conducting plane surface of $C_1$ is so arranged as to contain the axis of the circular guide so that the field on the axis of this guide is zero, which meets the conditions of the $H_0$ wave characterized by the field being zero along the axis of propagation. Thus it will be seen that this corrector may be regarded as a stabilizer of the electric field in the vicinity of the junction of the two guides. The piston $P_1$ is at a distance $l$ from the guide G approximating $$\frac{\lambda G}{4}$$

in order to bring one of the fields back into phase with the incident field and thus prevent loss of energy by radiation, and eliminate interference with the input wave.

On the other side of the joint is arranged an assembly which is identical with that described above and which comprises a guide S, a corrector $C_2$, in the axis of S, a piston $P_2$ at a distance $l'$ from S approximating $$\frac{\lambda G}{4}$$

The inlet of energy takes place at G, the outlet at S, where the inverse transformation is effected, i. e. the $H_0$ wave is transformed into the $H_{01}$ wave.

Finally, a filter F is arranged in the guide T, preferably at the location of the joint and upstream of the latter. Fig. 4 shows the arrangement of said filter, which consists of plurality of circular sectors a defining radial slots. Said filter will eliminate all waves differing from the $H_0$ type, such as $E_0$, $E_1$, $H_1$, $H_2$ which might be introduced into the guide T, and will produce only a very slight reflection of the $H_0$ wave, for the electric field of this wave is normal to the slots of the filter F.

Tests made with the device described have shown for example that it is possible to obtain a pass band with a very satisfactory coefficient of transmission (going more particularly from $\lambda=10.24$ cm. to $\lambda=10$ cm.) and, on the other hand, by using a magnetron with a peak power of 500 kw., the yield is also very satisfactory (92%), no singing being produced for a distance less than 0.5 mm. between the elements on the two sides of the joint.

We claim:

1. In a coupling arrangement between ultra high frequency wave guides, a rectangular guide traversed by a transverse electric wave of the $H_{01}$ type, a circular guide traversed by a transverse electric wave of the $H_0$ type, the said rectangular guide penetrating into the interior of the circular guide so that the small side of its section is placed substantially perpendicular to the axis of the circular guide and its large side parallel to said axis.

2. A device as in claim 1, which comprises a corrector consisting of a rectangular guide element, the axis of the corrector being in the extension of the axis of the said penetrating guide, said corrector being terminated by a conducting plane surface containing the axis of said circular guide.

3. A device as in claim 1, which comprises at the adjacent end of the circular guide a conducting piston located therein at a distance from the input circuit approximating a quarter of the operating wave length.

4. A device as in claim 1, comprising a filter, composed of sectors located in close proximity to the connection between said rectangular and circular guides and upstream of said connection.

5. In a coupling arrangement between ultra high frequency wave guides, a rectangular guide traversed by a transverse electric wave of the $H_{01}$ type, a circular guide traversed by a transverse electric wave of the $H_0$ type, the rectangular guide penetrating into the interior of the circular guide so that the small side of its section is placed substantially perpendicular to the axis of the circular guide and its large side parallel to said axis, the depth of said penetration being such that the open end of the rectangular guide is located substantially at the maximum field intensity level of the $H_0$ wave of the circular guide.

6. In a coupling arrangement between ultra high frequency wave guides, a rectangular guide traversed by a transverse electric wave of the $H_{01}$ type, a circular guide traversed by a transverse electric wave of the $H_0$ type, the rectangular guide penetrating into the interior of the circular guide so that the small side of its section is placed substantially perpendicular to the axis of the circular guide and its large side parallel to said axis, the depth of said penetration being such that the open end of the rectangular guide is located substantially at the maximum field level of the $H_0$ wave of the circular guide, and an electrically good conducting plane sheet located opposite to the rectangular guide opening, in the circular guide and containing the axis of the last guide.

7. In an ultra high frequency wave transmission system comprising a rotatable joint, two circular guides of the same diameter and rotatable relatively one to the other, one being arranged opposite the other so that their axes coincide, a guide of rectangular section traversed by a transverse electric wave of the type $H_{01}$ penetrating radially into each of said circular guides so that the long sides of said section are substantially parallel to said axes and reach a depth corresponding to a fraction of the radius of the circular guide, fixed pistons stabilizing the $H_{01}$ field penetrating radially into the two circular guides, opposite the rectangular guides, and to a depth so that their plane bases contain the axes of said circular guides, movable wave adjusting pistons closing the circular guide and a diaphragm filtering the $H_0$ wave arranged in one of said circular guides in the vicinity of the rotatable joint.

ANTOINE JEAN ORTUSI.
RAYMOND PAUL.

REFERENCES CITED

The following references are of record in the file of this patent:

UNITED STATES PATENTS

| Number | Name | Date |
| --- | --- | --- |
| 2,197,122 | Bowen | Apr. 16, 1940 |
| 2,407,318 | Mieher | Sept. 10, 1946 |